US011828691B2

(12) United States Patent
Arnold et al.

(10) Patent No.: US 11,828,691 B2
(45) Date of Patent: Nov. 28, 2023

(54) ELECTROMAGNETIC ASSEMBLIES FOR PROCESSING FLUIDS

(71) Applicant: DH Technologies Development Pte. Ltd., Singapore (SG)

(72) Inventors: Don W. Arnold, Livermore, CA (US); Thomas R. Covey, Newmarket (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 937 days.

(21) Appl. No.: 16/480,491

(22) PCT Filed: Jan. 23, 2018

(86) PCT No.: PCT/IB2018/050399
§ 371 (c)(1),
(2) Date: Jul. 24, 2019

(87) PCT Pub. No.: WO2018/138631
PCT Pub. Date: Aug. 2, 2018

(65) Prior Publication Data
US 2020/0011773 A1    Jan. 9, 2020

Related U.S. Application Data

(60) Provisional application No. 62/451,381, filed on Jan. 27, 2017.

(51) Int. Cl.
*G01N 1/38* (2006.01)
*B03C 1/01* (2006.01)
(Continued)

(52) U.S. Cl.
CPC ............ *G01N 1/38* (2013.01); *B01F 33/451* (2022.01); *B03C 1/01* (2013.01); *B03C 1/0335* (2013.01);
(Continued)

(58) Field of Classification Search
CPC .. G01N 1/38; G01N 1/4077; G01N 2001/386; G01N 2001/4061; G01N 30/14;
(Continued)

(56) References Cited

U.S. PATENT DOCUMENTS 6,231,760 B1 * 5/2001 Siddiqi ...................... B03C 1/24
366/273
6,402,367 B1 * 6/2002 Lu ........................... F27D 27/00
366/147

(Continued)

FOREIGN PATENT DOCUMENTS

| WO | 2015128725 A1 | 9/2015 | |
|---|---|---|---|
| WO | WO-2015128725 A1 * | 9/2015 | .......... B01F 13/0059 |
| WO | WO-2015132898 A1 * | 9/2015 | .......... B01F 13/0818 |

OTHER PUBLICATIONS

International Search Report and Written Opinion for PCT/IB2018/050399 dated May 2, 2018.

*Primary Examiner* — Gene O Crawford
*Assistant Examiner* — Muhammad Awais

(57) ABSTRACT

Methods and apparatus for processing fluids are described. In various aspects, a fluid processing system may include a magnetic assembly that includes a plurality of magnetic structures configured to generate a magnetic field gradient within a fluid container. The magnetic structures may be formed as a plurality of electromagnets configured to be individually actuated by a controller. Each of the electromagnets may generate a magnetic field within the fluid container. The electromagnets may be differentially actuated to create a magnetic field gradient within the fluid container to agitate, mix, or otherwise influence magnetic particles disposed within the fluid container. Activation of the electromagnets of an electromagnetic structure may generate a magnetic field gradient that influences magnetic particles in an x-y direction. In addition, activation of the electromag- (Continued)

nets of a plurality of electromagnetic structures may generate magnetic field gradients that influences magnetic particles in an x-y direction and z-direction.

18 Claims, 6 Drawing Sheets

(51) Int. Cl.
*B03C 1/033* (2006.01)
*B03C 1/28* (2006.01)
*G01N 1/40* (2006.01)
*B01F 33/451* (2022.01)
*B01F 101/23* (2022.01)

(52) U.S. Cl.
CPC ........... *B03C 1/288* (2013.01); *G01N 1/4077* (2013.01); *B01F 2101/23* (2022.01); *B03C 2201/18* (2013.01); *B03C 2201/26* (2013.01); *G01N 2001/386* (2013.01); *G01N 2001/4061* (2013.01)

(58) Field of Classification Search
CPC .... B01F 33/451; B01F 33/45; B01F 2101/23; B03C 1/01; B03C 1/0335; B03C 1/288; B03C 2201/18; B03C 2201/26

USPC .......................................................... 73/863

See application file for complete search history.

(56) References Cited

U.S. PATENT DOCUMENTS

| | | | |
|---|---|---|---|
| 8,399,229 B2* | 3/2013 | Sooryakumar | B03C 1/288 |
| | | | 210/695 |
| 9,114,995 B2* | 8/2015 | Wainerdi | B03C 1/005 |
| 9,511,368 B2* | 12/2016 | Kim | B03C 1/01 |
| 2003/0127396 A1* | 7/2003 | Siddiqi | B03C 1/0335 |
| | | | 210/695 |
| 2004/0168771 A1* | 9/2004 | Mitrovic | H01J 37/3266 |
| | | | 156/345.46 |
| 2007/0114181 A1* | 5/2007 | Li | G01N 33/54326 |
| | | | 210/695 |
| 2010/0158657 A1* | 6/2010 | Maekawa | B03C 1/288 |
| | | | 414/749.2 |
| 2013/0344477 A1* | 12/2013 | Parton | C12Q 1/24 |
| | | | 435/5 |
| 2015/0314303 A1* | 11/2015 | Barilits-Gupta | H01F 7/0294 |
| | | | 210/222 |
| 2015/0318158 A1* | 11/2015 | Pawliszyn | H01J 49/0031 |
| | | | 250/288 |
| 2016/0248309 A1* | 8/2016 | Copeland, Jr. | H02K 1/187 |
| 2017/0023526 A1* | 1/2017 | Rapoport | G01R 33/1269 |

* cited by examiner

ELECTROMAGNETIC ASSEMBLIES FOR PROCESSING FLUIDS

RELATED APPLICATIONS

This application claims the benefit of priority from U.S. Provisional Application Ser. No. 62/451,381, filed on Jan. 27, 2017, the entire contents of which is incorporated by reference herein.

FIELD

The present teachings generally relate to processing fluids and, more particularly, to methods and apparatus for processing fluids using electromagnetic structures configured to manipulate magnetic particles disposed within the fluids.

INTRODUCTION

The preparation of samples is a critical phase of chemical and biological analytical studies. In order to achieve precise and reliable analyses, target compounds must be processed from complex, raw samples and delivered to analytical equipment. For example, proteomic studies generally focus on a single protein or a group of proteins. Because non-target substances such as salts, buffers, detergents, proteins, enzymes, and other compounds that are typically found in chemical and biological samples can interfere with an analysis, for example, by causing a reduction in the amount of target signal detected by analytical equipment, raw samples are typically subjected to one or more separation and/or extraction techniques to isolate the target protein(s) from the other cellular material in the sample. Such exemplary processing includes, for example, protein isolation (e.g., immunoprecipitation), matrix cleanup, digestion, and desalting.

Liquid chromatography (LC) is a commonly-used solution-based technique for the separation of an analyte of interest from a complex mixture. LC generally involves running a liquid sample over a solid, insoluble matrix. The liquid sample may include an analyte of interest having an affinity for the matrix under certain conditions, for example, pH, salt concentration, or solvent composition conditions. During LC, the chemical components in a mixture may be carried through a stationary phase by the flow of a liquid mobile phase, with the separation occurring due to differences in the interactions of the analytes with both the mobile and stationary phases. High performance liquid chromatography (HPLC) is a form of LC in which an analyte is forced through the stationary phase in a liquid mobile phase at high pressure. Forcing the analyte using high pressure decreases the time the separated components remain on the stationary phase and, therefore, the time the components have to diffuse within the column. HPLC typically results in processed samples that may be used by analytical equipment to achieve better resolution and sensitivity compared with conventional LC techniques. However, LC is a complex technique that is costly to use for processing samples and is a serial process such that multiple, parallel columns are required to process a plurality of samples simultaneously. In addition, LC may irreversibly adsorb and/or co-elute certain potential target materials. Although HPLC is faster than LC (typically requiring about 10-30 minutes to process a sample), the complexity and cost of HPLC is much greater than conventional LC, for example, due to pumps and other specialized equipment required to carry out the process.

Magnetic particles or beads are another technology that may be employed for sample preparation for chemical and biological assays and diagnostics. Illustrative magnetic particles have been described in U.S. Pat. Nos. 4,582,622 and 4,628,037. Examples of devices and methods employing magnetic particles for sample separation and extraction are described in U.S. Pat. Nos. 4,554,088 and 8,361,316. Such magnetic particles have also been used in microfluidic systems, such as disclosed in an article entitled "Magnetic bead handling on-chip: new opportunities for analytical applications," authored by Martin A. M. Gijs and published in Microfluid Nanofluid (2004; I: 22-40).

Magnetic particle technology is a robust technology that provides for high performance (e.g., device sensitivity and accuracy) and also provides for easy automation of assay protocols. In some applications, the surface of magnetic particles can be coated with a suitable ligand or receptor (e.g., C18, antibodies, lectins, oligonucleotides, or other affinity groups), which can selectively bind a target substance or a group of analytes in a mixture. In some applications, the mass transfer of components from one substrate to another substrate is another consideration. One key element in magnetic particle separation and handling technology is efficient mixing to enhance the reaction rate between the target substances and the particle surfaces, the mass transfer from one substrate to another, or the transfer of an analyte from one medium to another. Suspended magnetic particles may be actuated by magnetic forces, resulting in agitation of a sample solution to enhance or generate mixing processes. Examples of magnetic particle mixing systems have been disclosed, for example, in an article entitled "A chaotic mixer for magnetic bead-based micro cell sorter," authored by Suzuki et al. and published in the Journal of Microelectromechanical Systems (2004; I: 13:779-790) and an article entitled "A rapid magnetic particle driven micromixer," authored by Wang et al. and published in Microfluid Nanofluid (2008; I: 4:375-389).

Previous techniques for mixing fluids using magnetic particles, such as disclosed in U.S. Pat. Nos. 6,231,760, 6,884,357, and 8,361,316, have involved moving a magnet relative to a stationary container or moving the container relative to a stationary magnet using mechanical means to induce relative displacement of a magnetic field gradient within the container. The displacement of magnetic field gradients using such methods may cause some mixing within the container by inducing the magnetic particles to move continuously with the change of the magnet position. However, the formation of the magnetic field gradient within the container may attract and confine the particles in regions close to the walls of the container, which reduces mixing efficiency and effectiveness. Another technique described in International Patent Application Publication No. WO 1991/09308 consists of two electromagnets facing each other around a chamber having magnetic particles arranged therein. Sequentially energizing and de-energizing the two electromagnets (i.e., binary on/off control) at a sufficient frequency operates to suspend the magnetic particles within a fluid disposed in the chamber. The movement of particles resulting from actuating the two electromagnets according to this method is limited to a small area within the chamber and generates relatively weak mixing forces. In addition, a portion of the magnetic particles may not be effected by the magnetic fields. The non-effected particles aggregate near chamber surfaces and do not contribute to mixing or affinity binding.

U.S. Pat. No. 8,585,279 discloses a microfluidic chip device (the "MagPhase" device of Spinomix SA) that employs radio frequency (RF) driven electromagnets in combination with integrated pumps and fluidic channels to actuate magnetic particles within an enclosed sample container. The electromagnets are actuated in a sequence configured to vary a magnetic field gradient within the sample container to effectuate the movement of the magnetic particles within a sample fluid. However, as with other conventional techniques, the MagPhase device only provides sample mixing in an x-y plane. In addition, due to the particular configuration, the MagPhase device experiences relatively large sample volume loss and magnetic particle loss. Furthermore, the enclosed channels and sample container of the MagPhase microfluidic device introduces a barrier to automation of the loading and collection of sample volumes from the device and limits the sample volumes capable of being processed. Samples processed using the MagPhase device are necessarily exposed to a large contact surface area as they are required to travel through the various channels and fluidic paths of the device. Accordingly, samples processed via the MagPhase device are susceptible to high carry-over and low recoveries, for example, due to non-specific binding.

Magnetic particles have also been used in sample plate applications, such as the SISCAPA technique described in an article entitled "Mass spectrometric quantitation of peptides and proteins using Stable Isotope Standards and Capture by Anti-Peptide Antibodies (SISCAPA)," authored by Anderson et al. and published in the Journal of Proteome Research (2004; I: 3:235-244). Example magnetic sample plate systems include the Agencourt SPRIPlate 96R—Ring Super Magnet Plate provided by Beckman Coulter, Inc. of Brea, California, United States and the Magnum FLX provided by Alpaqua® of Beverly, Massachusetts, United States. In these applications, the sample plates include a plurality of fixed-field magnets arranged such that the magnets either protrude between the sample wells or allow the sample wells to be positioned within ring-shaped magnets. Magnetic particles within the sample wells may be agitated by placing a permanent magnet near the sample plate to promote mixing. Other types of automated mixing devices generally attempt to achieve mixing by mechanical agitation (i.e., by shaking the sample plate). After processing the samples, the magnets may be used to confine the beads to the side of the sample wells to allow for the removal of the sample fluid. However, the fixed-field magnets used in conventional magnetic sample plate applications are not capable of achieving robust mixing. For example, the magnetic particles generally tend to aggregate and cluster in discrete areas of the sample wells. In addition, the plate itself must be moved between steps of the analysis, which requires significant automation.

Accordingly, a need exists to improve the overall speed and efficiency of sample mixing and separation using magnetic particles, including ultra-fast homogenous mixing of sample fluids. A need also exists to improve the overall speed and efficiency of sample mixing and separation using a variety of magnetic particles (e.g., ferromagnetic, paramagnetic, and mixtures thereof) of a broad volume range, for example including larger volume samples.

SUMMARY

Apparatus, systems, and methods in accordance with various aspects of the applicant's teachings allow for the processing of fluids using electromagnetic assemblies without the limitations on sample volume, sample loss, and magnetic particle loss experienced with known systems. In various aspects, the systems and methods described herein additionally provide for increased magnetic field strength within the sample volume, thereby enabling improved mixing, improved mass transfer, reduced power consumption, and/or reduced heat generation relative to known magnetic particle mixing systems. In addition, the increased magnetic field strength provided by the systems and methods described herein can substantially improve the efficiency of known assays that are based, for example, on the use of functionalized paramagnetic particles, which typically exhibit a weaker magnetic response relative to ferromagnetic particles having permanent magnetic dipoles. In various aspects, mass transfer of substances from one medium to another medium (e.g., solid or liquid) can also be enhanced. By way of example, fluids can be processed within a fluid container, such as an open fluid container (e.g., open to the ambient atmosphere, without a top cover), using magnetic particles disposed within the fluids. The magnetic particles can be configured to be agitated by a magnetic field generated by magnetic structures arranged adjacent to the fluid containers, for example, arranged in a two-dimensional array about the periphery of the fluid container. Based on the selective application of signals to the magnetic structures surrounding the fluid container, the magnetic particles may be influenced to rotate, spin, and/or move laterally side-to-side within the fluid so as to rapidly and efficiently mix the fluid and/or capture target analytes within the fluid, by way of non-limiting example. As noted above, the magnetic structures can be formed from a plurality of electromagnets disposed around the fluid container, with each electromagnet being individually controlled to generate a desired magnetic field within the fluid container effective to influence the magnetic particles disposed therein.

The magnetic assembly can also include a plurality of vertically-spaced magnetic structures (e.g., having electromagnets arranged in multiple horizontal layers). In some embodiments, the vertical position of one or more of the magnetic structures can be adjustable, for instance, to process different sample volumes. Based on the selective application of signals to the various electromagnets of the one or more magnetic structures at the one or more vertical positions of the electromagnetic assembly, the magnetic particles can be influenced to rotate, spin, move horizontally (laterally) side-to-side, and/or vertically up-and-down by the combined effect of the magnetic field gradients generated by the various electromagnets within the fluid so as to rapidly and efficiently mix the fluid and/or capture target analytes within the fluid, by way of non-limiting example. As noted above, the magnetic structures can be formed from a plurality of electromagnets disposed around the fluid container, with each electromagnet being individually controlled to generate a desired magnetic field within the fluid container effective to influence the magnetic particles disposed therein. By way of example, the signals applied to the electromagnets of each magnetic structure (e.g., in a single horizontal layer) can generate magnetic field gradients substantially in the x-y plane, while the signals applied to the electromagnets of the different magnetic structures (e.g., the electromagnets in different horizontal layers) can result in magnetic field gradients exhibiting a z-direction or vertical component.

In accordance with various aspects of the present teachings, systems and methods described herein can utilize containers that can be filled or partially-filled with various volumes of the fluid sample, thereby allowing for the reduction or expansion of the sample volume to be processed, depending for example on the availability or expense of the sample and/or on the requirements of a particular assay. In some aspects, samples to be processed (and the reagents utilized to process the same) can be directly added to the open fluid container (e.g., via an auto-sampler or pipette inserted through the open end of the container) and can likewise be directly removed therefrom (e.g., via a capture device) following the processing, for example. By way of another example, the fluid container may comprise a chamber having continuous fluid flow.

In accordance with various aspects of the applicant's teachings, a fluid processing system is provided that comprises a magnetic assembly having at least one magnetic structure, with each magnetic structure comprising a plurality of electromagnets disposed about the periphery of a center axis, wherein each of the plurality of electromagnets has an electrically-conductive coil disposed about a centerline extending toward the center axis of the magnetic structure. The magnetic structure is configured to receive a fluid container defining a fluid chamber therein for containing a fluid and a plurality of magnetic particles, with each of the plurality of electromagnets being configured to generate a magnetic field within the fluid container disposed on the center axis of the magnetic structure when an electrical signal is applied to each of the electromagnet's electrically-conductive coil. A control component can be coupled to the at least one magnetic structure and can be configured to control the magnetic field generated by each of the plurality of electromagnets so as to generate a magnetic field gradient within the at least one fluid container sufficient to magnetically influence the plurality of magnetic particles within the fluid.

The magnetic structure(s) can have a variety of configurations. The plurality of electromagnets in each of the magnetic structures can vary in number, but in some aspects the magnetic structures can comprise four electromagnets which define a space therebetween within which the fluid container can be disposed. By way of example, in some aspects, the centerline of each of the plurality of electromagnets can be co-planar with the centerline of the other of the plurality of electromagnets. For example, in some related aspects, the four electromagnets can comprise a first pair of electromagnets each of which has an electrically-conductive coil disposed about a first centerline extending through the center axis, wherein the electromagnets of the first pair are disposed on opposed sides of the center axis, and a second pair of electromagnets each of which has an electrically-conductive coil disposed about a second centerline extending through the center axis, wherein the electromagnets of the second pair are disposed on opposed sides of the center axis, and wherein the second centerline is perpendicular to the first centerline. In certain related aspects, the control component can be configured to apply an electrical signal to the electromagnets such that each electromagnet in the first pair generates a magnetic field on the first centerline in the same direction as the other electromagnet in the first pair and such that each electromagnet in the second pair generates a magnetic field on the second centerline in the same direction as the other electromagnet in the second pair.

Additionally or alternatively, in various aspects, the magnetic assembly can comprise a plurality of magnetic structures disposed in at least two horizontal layers corresponding to a plurality of vertical positions about the center axis, wherein each magnetic structure is configured to magnetically influence the plurality of magnetic particles in an x-y direction within its corresponding horizontal layer when an electrical signal is provided to the electromagnets of each magnetic structure independent of the other of said plurality of magnetic structures in other layers. In some related aspects, the centerline of each of the plurality of electromagnets in each horizontal layer can be co-planar, and wherein the centerlines of the electromagnets in each horizontal layer are in a parallel plane relative to the centerlines of the electromagnets in the other of the at least two horizontal layers.

In some aspects, the fluid processing system can be configured as a standalone mixing device that can process the fluid contained in a single vial or one or more vials simultaneously. For example, the magnetic assembly can comprise an array (e.g., a horizontal array) of a plurality of magnetic structures each of which is configured to receive a fluidically-isolated container, wherein the center axis of each magnetic structure is parallel to the center axis of the other of the plurality of magnetic structures, and wherein at least one electromagnet of the array is shared between adjacent magnetic structures and is configured to generate a magnetic field in at least two of the fluidically-isolated fluid containers. For example, the at least one fluid container can comprise a plurality of sample wells arranged within a sample plate and the electromagnets of the at least one magnetic assembly can be configured to simultaneously influence the magnetic particles arranged within a plurality of the sample wells. In various aspects, the fluid processing system can include a plurality of sample wells arranged within a sample plate that can be integrated with or removably associated with the magnetic assembly so as to simultaneously influence magnetic particles arranged within each of the plurality of sample wells. In some embodiments, the sample plate is formed as an open-well sample plate having one or more fluidically-isolated sample chambers. For example, in some embodiments, the open-well sample plate comprises a 96 well sample plate modified in accordance with the present teachings. In some embodiments, the open-well sample plate may include more than 96 sample wells. In some embodiments, the open-well sample plate may include less than 96 sample wells, such as 1, 4, 8, 12, 32, and 64 sample wells. In some embodiments, the open well sample plate may comprise a single vial. In some aspects, the sample plate comprises a bottom surface configured to removably engage at least a portion of the electromagnetic structures (e.g., the sample plate can be removed from the electromagnetic assembly).

The fluid container can also have a variety of configurations in accordance with various aspects of the present teachings. By way of example, in some aspects, the fluid chamber can extend from a lower, closed end to an upper, open end configured to be open to the atmosphere to receive the fluid to be processed therethrough. In some aspects, for example, the fluid container can comprise an open port probe, the open port probe comprising a tubular member, an inlet for the inflow of a solvent and an outlet for the outflow of the solvent and a tip end open to the atmosphere and configured such that the inflow and outflow of the solvent are directed to the tip end to maintain a steady state level of solvent. In related aspects, the open port probe can be configured to receive a substrate having an analyte in at least a portion of its surface to the solvent to cause transfer of at least a portion of the analyte from the substrate surface to the solvent. By way of non-limiting example, the substrate can be a solid phase microextraction (SPME) fibre.

In various aspects, the present teachings can enable the use of paramagnetic particles as the magnetic particles, though ferromagnetic particles can also be used. In some aspects, for example, a mixture of functionalized paramagnetic particles and chemically, inert ferromagnetic particles that can assist in the mixing of the sample volume can be contained within the fluid container. In some aspects, paramagnetic particles can be utilized for mixing without the assistance of ferromagnetic particles.

In accordance with various aspects of the applicant's present teachings, the controller can be configured to differentially actuate the electromagnets via the application of one or more radio frequency (RF) signals, direct current (DC) signals, alternating current (AC) signals, or the like. By way of non-limiting example, in some aspects in which the magnetic particles are paramagnetic, the control component can be configured to control the magnetic field generated by each of the plurality of electromagnets via applying a square waveform to each of the plurality of electromagnets. For example, the square waveform can exhibit a frequency in a range of about 0.5 Hz to about 30 Hz. Alternatively, in some aspects, the control component can be configured to control the magnetic field generated by each of the plurality of electromagnets, with the AC signals applied to the plurality of electromagnets exhibiting different phase delays relative to one another so as to effect the desired movement of the electromagnets within the sample fluid. In some aspects, the DC signals can be effective to isolate the electromagnets (e.g., draw magnetic particles to one side and/or vertical level of the fluid container) such that fluid can be withdrawn from the container without aspiration of the magnetic particles, by way of non-limiting example. In some aspects, the at least one AC waveform applied to each of the plurality of electromagnets can exhibit a phase delay relative to the signals of the other plurality of electromagnets. For example, the phase delay can be a 30° phase delay, a 60° phase delay, a 90° phase delay, a 120° phase delay, a 150° phase delay, a 180° phase delay, a 210° phase delay, a 240° phase delay, a 270° phase delay, a 300° phase delay, a 330° phase delay, a 360° phase delay, and any value or range between any two of these values (including endpoints). In one aspect, for example, the control signal applied to the four electromagnets in each magnetic structure (e.g., in each horizontal layer) can comprise an AC waveform exhibiting a ±90° shift relative to the adjacent electromagnets in that layer and/or the control signal applied to the four electromagnets in a magnetic structure can comprise an AC waveform exhibiting a ±90° shift relative to its vertically-adjacent electromagnet in another magnetic structure (e.g., of a different horizontal layer). In various related aspects, the fluid processing system can include at least one memory operatively coupled to the controller configured, for example, to store at least one sample processing protocol for execution by the controller. In some aspects, the system can be configured to process the at least one fluid by mixing it. In some aspects, the system can be configured to process the at least one fluid by performing fluid separation to capture at least one target analyte within the at least one fluid.

In some aspects, the magnetic assembly is configured to magnetically influence the plurality of magnetic particles in a horizontal x-y direction and/or a vertical z-direction. Based on the selective application of electrical signals to the plurality of electromagnets surrounding the fluid container at the one or more various vertical positions, the magnetic particles can be influenced to rotate, spin, move horizontally side-to-side, and/or vertically up-and-down within the fluid sample by the combined effect of the magnetic field gradients generated by the various electromagnets. For example, the signals applied to the electromagnets of each magnetic structure can be configured to generate magnetic field gradients substantially in the x-y plane, while the signals applied to the electromagnets of the different magnetic structures, if present (e.g., the electromagnets in different horizontal layers) can result in magnetic field gradients exhibiting a z-direction or vertical component. By way of non-limiting example, when more than one magnetic structure is present, the plurality of magnetic structures can be disposed substantially in horizontal layers corresponding to the plurality of vertical positions, wherein each magnetic structure can be configured to magnetically influence the plurality of magnetic particles in an x-y direction substantially within its corresponding horizontal layer when activated by the control component independent of the other of said plurality of magnetic structures. In some aspects, the fluid processing system may further include a positioning element configured to adjust a vertical position of at least one of the plurality of electromagnets relative to the fluid container. In some embodiments, the positioning element is configured to adjust the position based on a volume of the at least one fluid in the fluid chamber. Additionally or alternatively, in some aspects the magnetic assembly can comprise at least three magnetic structures that are configured to be selectively activated based on at least one of the volume of the fluid in the fluid chamber and to maintain the magnetic particles at a desired fluid level within the volume.

In accordance with various aspects of the present teachings, the system may operate to achieve a broad range of volume sample preparation, including larger volumes, including those up to 10 mL. This can include vertical mixing techniques in certain embodiments. In accordance with various aspects of the present teachings, the system may operate without the integrated microfluidic delivery of the sample to the mixing chamber within the container such that the methods and systems disclosed herein can enable the processing of a variety of different volumes of samples therewithin. Whereas micro-fluidic based systems generally are closed systems that rely on diffusion, capillary forces, or microfluidic pumps to transport a fixed quantity of liquid through fully-filled microfluidic networks, systems and methods in accordance with various aspects of the present teachings can utilize containers that can be filled or partially-filled with various volumes of the fluid sample, thereby allowing for the reduction or expansion of the sample volume to be processed, depending for example on the availability or expense of the sample and/or on the requirements of a particular assay. In some aspects, samples to be processed (and the reagents utilized to process the same) can be directly added to the open fluid container (e.g., via an auto-sampler or pipette inserted through the open end of the container) and can likewise be directly removed therefrom (e.g., via a capture device) following the processing, for example. In accordance with various aspects of the applicant's teachings, the methods and systems disclosed herein can process a variety of different volumes of samples.

The fluid container(s) can have a variety of configurations. For example, in some aspects, the fluid chamber can be configured to extend from a lower, closed end to an upper, open end that is configured to be open to the atmosphere to receive the fluid to be processed therethrough. In some aspects, the at least one fluid container can be configured as a macro-scale fluid container that is configured to operate when partially-filled. The fluid chamber can exhibit a variety of maximum volumes such as in a range of about 1 mL to about 10 mL, by way of non-limiting example. Additionally or alternatively, in various aspects, the at least one fluid container can comprise a plurality of fluidically-isolated fluid containers, wherein at least a portion of the plurality of electromagnets are configured to generate the magnetic field within two or more of the plurality of fluid containers.

In accordance with various aspects of the applicant's present teachings, the fluid processing system can be utilized to prepare a sample for or to interface with any number of downstream analysis instruments, including a liquid chromatography (LC) column, chemical electrophoresis (CE) system, a differential mobility spectrometer (DMS), or a mass spectrometer (MS) system (e.g., an ion source of a mass spectrometer), all by way of non-limiting example, that can be configured to receive the fluid from the fluid processing system. Moreover, in various aspects, the fluid may be analyzed using a mass spectrometer (MS). In accordance with various aspects of the applicant's present teachings, fluid processed by the fluid processing system can be transferred to a MS, DMS-MS, LC-MS, LC-DMS-MS via various fluid handling techniques, including, without limitation, auto-samplers, acoustic droplet dispensers, or the like.

In accordance with various aspects of the present teachings, a method for processing fluids is provided that comprises delivering a fluid and a plurality of magnetic particles to a fluid chamber of at least one fluid container disposed on a center axis of a magnetic assembly comprising at least one magnetic structure, wherein the at least one magnetic structure comprises a plurality of electromagnets disposed about the periphery of the fluid container, with each of the plurality of electromagnets having an electrically-conductive coil disposed about a centerline that extends toward the center axis. An electrical signal can be provided to each of the plurality of electromagnets so as to generate a magnetic field within the at least one fluid container so as to influence the plurality of magnetic particles, and the electrical signal can be adjusted to modify the magnetic field within the fluid sample. Thereafter, the sample fluid can be withdrawn from the fluid container. In various aspects, the magnetic particles can be paramagnetic particles, and adjusting the electrical signal can comprise applying a square waveform to each of the plurality of electromagnets, for example. In some aspects, the electrical signal provided to each of the plurality of electromagnets can comprise an AC waveform.

In certain aspects, the fluid container can be an open port probe comprising a tubular member, an inlet and an outlet for a solvent, a tip end open to the atmosphere and configured such that a solvent is directed to the tip end. In such aspects, a substrate surface having an embedded analyte to the solvent can contact the solvent to cause transfer of at least a portion of the analyte from the substrate surface to the solvent. By way of non-limiting example, the substrate surface can comprise a solid phase microextraction (SPME) fiber. In certain aspects, the fluid can be a sample fluid that can be delivered directly to the fluid chamber of the at least one fluid container using any of an auto-sampler, a pipette, and an acoustic droplet dispenser.

In various aspects, adjusting the electrical signal to modify the magnetic field within the fluid sample comprises performing a multi-step sample processing protocol. By way of example, the method can comprise adding one or more reagents to the at least one fluid container after a first step of the sample processing protocol.

In some aspects, the method can comprise adjusting a vertical position of at least one of the plurality of electromagnets relative to the fluid container based on the volume of the fluid in the fluid chamber or to maintain the magnetic particles at a desired fluid level within the volume. Additionally or alternatively, in some aspects the magnetic assembly can comprise at least one magnetic structure, the method further comprising selectively activating the at least one magnetic structure based on at least one of the volume of the fluid in the fluid chamber and to maintain the magnetic particles at a desired fluid level within the volume. For example, in some aspects, adjusting the electrical signal to modify the magnetic field within the fluid sample can comprise performing a multi-step sample processing protocol that can also include adjusting the vertical position of some of the electromagnets and/or selectively activating the electrodes of the various magnetic structures.

In some aspects, a method of processing a substrate surface with an embedded analyte comprises delivering a fluid sample and a plurality of magnetic particles to a fluid chamber of at least one fluid container associate with an electromagnetic assembly disposed around the periphery of the fluid container, and contacting the substrate surface having an embedded analyte to the fluid to cause transfer of at least a portion of the analyte from the substrate surface to the fluid. In some alternative aspects, the method can comprise contacting a substrate surface exhibiting an affinity for an analyte within the fluid container to the fluid to cause transfer of at least a portion of the analyte from the fluid to the substrate surface.

These and other features of the applicant's teaching are set forth herein.

BRIEF DESCRIPTION OF THE DRAWINGS

A detailed description of various embodiments is provided herein below with reference, by way of example, to the following drawings. It will be understood that the drawings are exemplary only and that all reference to the drawings is made for the purpose of illustration only, and is not intended to limit the scope of the embodiments described herein below in any way. For convenience, reference numerals may also be repeated (with or without an offset) throughout the figures to indicate analogous components or features.

DETAILED DESCRIPTION

Figure 1A:
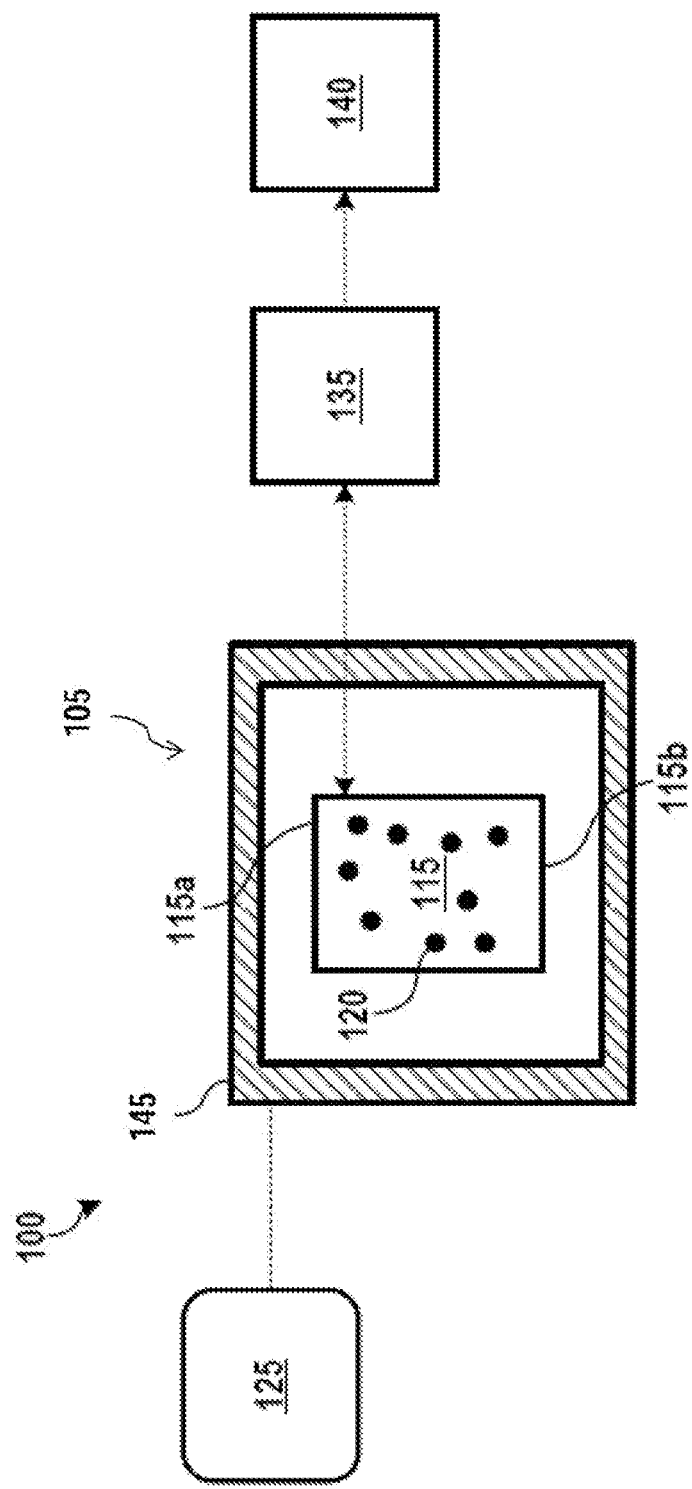
FIGS. 1A-1D depict exemplary fluid processing systems according to various aspects of the applicant's teachings.

Those skilled in the art will understand that the methods, systems, and apparatus described herein are non-limiting exemplary embodiments and that the scope of the applicant's disclosure is defined solely by the claims. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art. The features illustrated or described in connection with one exemplary embodiment may be combined with the features of other embodiments. Such modifications and variations are intended to be included within the scope of the applicant's disclosure.

The present teachings generally relate to fluid processing methods and systems for mixing, separating, filtering, or otherwise processing a fluid (e.g., a fluid sample, a solvent) by utilizing magnetic particles that are caused to move under the influence of an electromagnetic assembly disposed about a fluid container for containing the fluid. The use of electromagnetic assemblies to influence magnetic particles according to various aspects of the present teachings, for instance, can address limitations on sample volume, sample loss, and magnetic particle loss experienced with conventional magnetic particle processing systems. Additionally, the present teachings can provide multiple technological advantages, including increased magnetic field strength within the sample volume, thereby enabling improved mixing, improved mass transfer, reduced power consumption, and/or reduced heat generation relative to known magnetic particle mixing systems. One non-limiting example of such an advantage due to the increased magnetic field strength provided by the systems and methods described herein is a substantial improvement of the efficiency of known assays based on the use of functionalized paramagnetic particles, which can exhibit a weaker magnetic response relative to ferromagnetic particles having permanent magnetic dipoles. Another non-limiting example of such an advantage includes significantly improved rates of diffusion for increased sample contact rate in various volumes of the sample fluid, for example, to improve analyte capture efficiency in a magnetic immunoassay. Another non-limiting example of a technological advantage includes increased sample mixing efficiency as the magnetic structures of a magnetic assembly can influence the magnetic particles to provide for faster and more effective sample mixing due to, for example, more robust magnetic particle movement and movement in multiple dimensions, with less power consumption due to the configuration of the magnetic field of the electromagnetic assemblies relative to the fluid container(s). This can also, for example, lead to increased mass transfer of substances from one medium to another medium (e.g., from a solid substrate to the liquid such as desorption or from the liquid to a solid substrate or the magnetic particles themselves as in analyte capture). It will be appreciated in light of the present teachings that the fluid processing systems described herein provide multiple other technological advantages in addition to the aforementioned non-limiting examples.

In accordance with various aspects of the present teachings, fluids can be processed within a fluid container, such as an open fluid container (e.g., open to the ambient atmosphere, without a top cover), using magnetic particles disposed within the fluids. The magnetic particles can be configured to be agitated by a magnetic field generated by magnetic structures disposed adjacent to the fluid containers (e.g., arranged in a two-dimensional array about the periphery of the fluid container). Based on the selective application of signals to the magnetic structures surrounding the fluid container, the magnetic particles may be influenced to rotate, spin, and/or move laterally side-to-side within the fluid so as to rapidly and efficiently mix the fluid and/or capture target analytes within the fluid, by way of non-limiting example. As noted above, the magnetic structures can be formed from a plurality of electromagnets disposed around the fluid container, with each electromagnet being individually controlled to generate a desired magnetic field within the fluid container effective to influence the magnetic particles disposed therein, for example, in accordance with a sample processing protocol comprising various steps.

While the systems, devices, and methods described herein can be used in conjunction with many different fluid processing systems, an exemplary fluid processing system 100 is illustrated schematically in FIG. 1A. It should be understood that the fluid processing system 100 represents only one possible fluid processing system for use in accordance with embodiments of the systems, devices, and methods described herein, and fluid processing systems and/or components thereof having other configurations and operational characteristics can all be used in accordance with the systems, devices, and methods described herein as well. As shown in FIG. 1A, the exemplary fluid processing system 100 includes a magnetic assembly 105 comprising at least one magnetic structure 145 that can be associated with a fluid container 115. As discussed in detail below, the magnetic structure 145 is configured to generate a magnetic field gradient or magnetic force within the fluid container and can comprise a plurality of electromagnets that can be disposed relative to the fluid container 115 so as to generate a magnetic field therein.

Figure 1B:
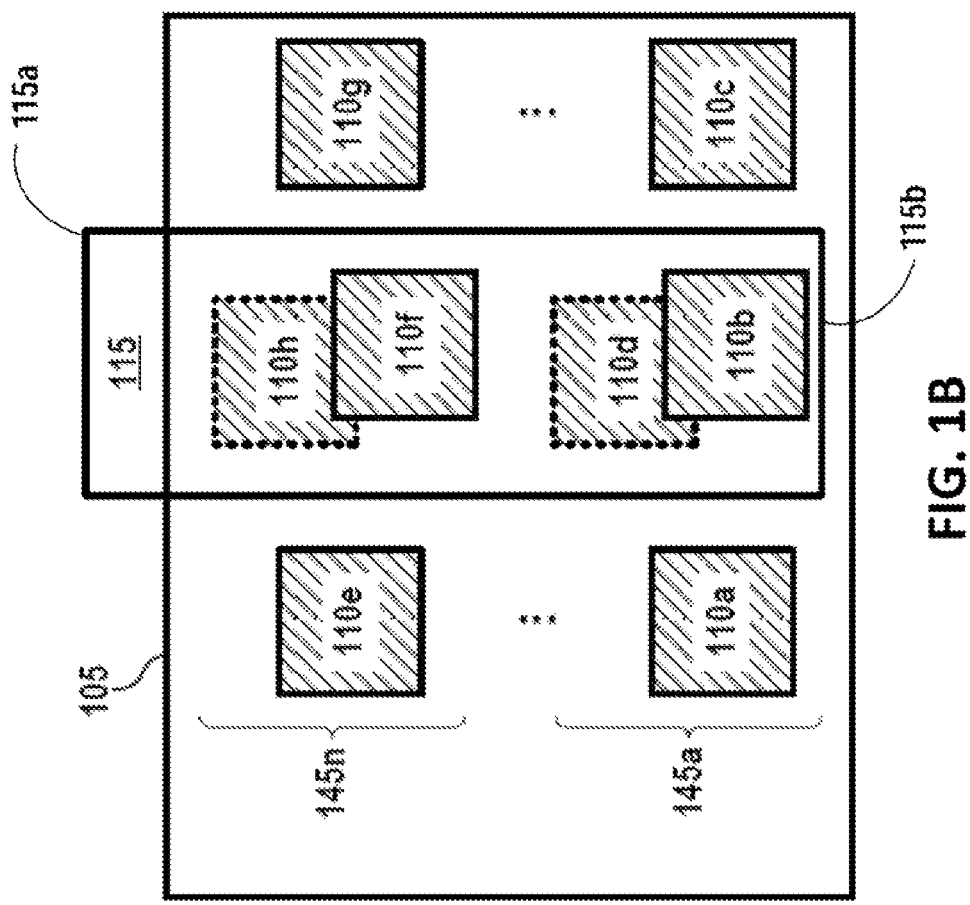

The fluid container 115 can generally comprise any type of container configured to hold a sample fluid, such as a sample well, a vial, a fluid reservoir, or the like, defining a fluid-containing chamber therein. As best shown in FIG. 1B, the exemplary fluid container 115 can extend from an open, upper end 115$a$ (open to the ambient atmosphere) to a lower, closed end 115$b$ such that the fluid within the fluid container 115 can be loaded into the open, upper end 115$a$ and/or removed therefrom by one or more liquid loading/collection devices 135 (as shown in FIG. 1A). It will be appreciated by those skilled in the art that the container 115 can include a removable cap that can be coupled to the open, upper end 115$a$ (e.g., an Eppendorf tube) during various processing steps, for example, to prevent the escape of fluid, contamination, and/or evaporation. Illustrative liquid loading/collection devices 135 may include, without limitation, manual sample loading devices (e.g., pipette), multi-channel pipette devices, acoustic liquid handling devices, and/or an autosampler, all by way of non-limiting example. Fluid processing systems described according to various aspects of the present teachings can be configured to process fluids at the micro-scale or macro-scale (including large-volume formats). In general, the macro-scale involves fluid volumes in the milliliter range, while micro-scale fluid processing involves fluid volumes below the milliliter range, such as microliters, nanoliters, or picoliters. Large-volume formats can involve the processing of fluid volumes greater than 1 mL. For example, fluid processing systems in accordance with various aspects of the present teaching can be capable of processing a fluid volume of about 50 µL to about 1 mL and even greater, including for example, about 1.5 mL, about 2 mL, about 5 mL, about 10 mL, or greater. However, it will be appreciated in light of the present teachings that the fluid processing systems may process any fluid volume capable of operating as described herein.

As shown in FIG. 1A, the fluid can have a plurality of magnetic particles 120 disposed therein and that can be added to the sample fluid prior to transferring the sample fluid to the fluid container 115, or can be added to the fluid container 115 before or after the sample fluid has been transferred thereto. The magnetic particles 120 or portions thereof may be formed from various magnetically susceptible materials, including, without limitation ferromagnetic materials, such as various iron oxide materials (e.g., $Fe_2O_3$, $SiO_2$ coated $Fe_2O_3$, $Fe_3O_4$, or the like). In some embodiments, the magnetic particles 120 may include a magnetic "core" coated with a non-magnetic coating, for example, that is configured to not react with the fluids and/or to selectively bind a material (e.g., a biomaterial) of interest. Additionally or alternatively, in some embodiments, the magnetic particles can include beads modified with various alkyl groups, such as C18 alkyl groups ("C18 beads"). By way of non-limiting example, such C18 beads may be used for the purification, desalting and concentration of peptides and protein digests, which is a major function of LC. It will also be appreciated by a person skilled in the art in light of the present teachings that in some embodiments, the magnetic particles can comprise beads that have been functionalized, for example, by being coated with antibodies ("affinity beads") to provide for selective binding of particular analytes within the sample. The magnetic particles 120 may have various shapes, such as spherical and/or rod-shaped (i.e., magnetic stir bars), such as described in International Patent Application Publication No. WO 2015/128725. In some embodiments, the magnetic particles 120 can comprise a mixture of functionalized, paramagnetic beads and chemically, inert ferromagnetic particles that agitate all of the magnetic particles in the fluid and/or to facilitate movement of the magnetic particles within the system. However, as discussed otherwise herein, because of the enhanced magnetic fields within the fluid container generated by the systems and methods in accordance with various aspects of the present teachings, the magnetic particles in the fluid container can substantially consist of paramagnetic particles (e.g., less than 5% ferromagnetic particles, substantially no ferromagnetic particles), despite the typically weaker magnetic response of paramagnetic materials. By way of non-limiting example, paramagnetic Solid Phase Reversible Immobilization (SPRI) beads from Beckman can be more efficiently utilized in the systems and methods described herein in accordance with various aspects of the present teachings.

As noted above, the magnetic structure 145 can include a plurality of electromagnets. Although four electromagnets 110 are associated with each magnetic structure depicted in FIG. 1B and FIG. 2, for example, it will be appreciated that the present teachings are not so limited as any number of electromagnets capable of operating according to various aspects of the applicant's teachings may be used. For example, a magnetic structure 145 may include 2 electromagnets, 3 electromagnets, 4 electromagnets, 5 electromagnets, 6 electromagnets, 7 electromagnets, 8 electromagnets, 9 electromagnets, 10 electromagnets, or more. The electromagnets may include any electromagnet known to those having skill in the art, including, for example, a ferromagnetic-core solenoid. The electromagnets may have various shapes, including square, rectangular, round, elliptical, or any other shape capable of operating according to various aspects of the applicant's teachings. Additionally, in some aspects, magnetic lenses can be utilized so as to modify (e.g., re-shape) the magnetic field generated by the electromagnets within the fluid sample.

With reference again to FIG. 1A, the exemplary fluid processing system 100 additionally includes a controller 125 operatively coupled to the magnetic structure 105 and configured to control the magnetic fields produced by its electromagnets. In various aspects, the controller 125 can be configured to control one or more power sources (not shown) configured to supply an electrical signal to the plurality of electromagnets. In some embodiments, the controller 125 can operate to regulate the magnetic field produced by each of the electromagnets by controlling the amplitude, frequency, and direction of the electrical current passing through a solenoid of each of the electromagnets. In some embodiments, the electrical signal can be in the form of radio frequency (RF) waveforms, DC current, AC current (e.g., a square waveform), or the like. Indeed, it will be appreciated that any type of electrical current capable of operating according to various aspects of applicant's teachings to promote mixing of the fluid sample are contemplated herein. By way of example, a DC signal can additionally or alternatively be applied to one or more the electromagnets so as to draw magnetic particles to one or more sides of the fluid container (and out of the bulk fluid) so as to aid in fluid transfer from the container after the mixing step and/or prevent the aspiration of the magnetic particles, by way of non-limiting example. In various aspects, the controller 125 can be any type of device and/or electrical component capable of actuating an electromagnet. For example, in some aspects, the controller 125 can include or be coupled to a logic device (not shown) and/or a memory, such as a computing device configured to execute an application configured to provide instructions for controlling the electromagnets of the magnetic structure(s) 145. In some embodiments, the application can provide instructions based on operator input and/or feedback from the fluid processing system 100. In some embodiments, the application can include and/or the memory may be configured to store one or more sample processing protocols for execution by the controller 125.

In various aspects, each electromagnet in the magnetic structure 145 can be individually addressed and actuated by the controller 125. For example, the controller 125 can supply RF or AC electrical signals of different phases to each of the one or more of the electromagnets such that one or more of the electromagnets generate a different magnetic field relative to the other of the electromagnets. As discussed in detail below with reference to FIG. 2, because the electromagnets are disposed at different locations relative to the fluid container, the orientation of the magnetic field generated by each electromagnet can differ even when the same electrical signal is applied thereto. For example, because electromagnetic pairs can be arranged on opposed sides of the fluid container, the magnetic field generated by the electrode in each pair can be in the same direction.

In this manner, the magnetic field gradient generated by the magnetic structure 145 within the fluid container 115 can be rapidly and effectively controlled to manipulate the movement of magnetic particles 120 within the sample fluid. In some embodiments, the electrical signals and the characteristics thereof (e.g., phase shifts, frequency, amplitude) can be applied to the various electromagnets according to the sample processing protocol. It will be appreciated in light of the present teachings that the magnetic structures 105 can be utilized to manipulate the magnetic particles 120 within the sample fluid in various processes including, without limitation, protein assays, sample derivatization (e.g., steroid derivatization, sample derivatization for gas chromatography, etc.), and/or sample purification and desalting. Following this processing, processed fluid may be delivered to various analytical equipment 140, such as a mass spectrometer (MS) for analysis.

Processing samples using the fluid processing structures configured according to applicant's teachings can also enhance reaction kinetics. For instance, protein processing (including immunological affinity pull-down, washing, elution/denaturation, reduction, alkylation, and digestion steps) can be completed in about 10-12 minutes, compared with a one- or two-day processing time for in-tube processing with mechanical agitation. The increased processing speed can be achieved, for example, by overcoming diffusion as a rate-limiting step of fluid processing (e.g., a rate-limiting step of in-tube processing with mechanical agitation) and the necessity of utilizing small, fixed volumes in known microfluidic platforms. In addition, such fast, efficient sample processing can be simultaneously achieved across a plurality of fluid containers as the fluid processing structures in accordance with the present teachings can be integrated into arrays of sample reaction wells, thereby increasing sample processing and enabling automation via an auto-sampler, for example.

In accordance with various aspects of the present teachings, the magnetic structure 105 schematically depicted in FIG. 1 can be incorporated into various fluid processing systems and fluid handling devices. The magnetic assembly can include, for example, one or a plurality of magnetic structures arranged in horizontal or substantially horizontal layers. Additionally or alternatively, in some embodiments, the electromagnets of the various magnetic structures (e.g., of the different vertically-spaced layers) can be selectively energized so as to process different sample volumes and/or to affect a characteristic of a magnetic field generated by the magnetic assembly.

For example, with specific reference now to FIG. 1B, the magnetic assembly 105 can include a plurality of electromagnet structures 145a-n, each of which comprises a horizontal or substantially horizontal layer of electromagnets 110 arranged in a plane normal or substantially normal to the vertical axis of the fluid container 115. As indicated by the number of magnetic structures 145a-n, the exemplary magnetic assembly 105 can comprise a plurality of vertically-spaced layers, including 2 electromagnet structures, 3 electromagnet structures, 4 electromagnet structures, 5 electromagnet structures, 10 electromagnet structures, 20 electromagnet structures, or more. Additionally, it will be appreciated that although four electromagnets 110 are depicted as being associated with each electromagnet structure 145 in FIG. 1B (e.g., electromagnets 110a-d in magnetic structure 145a and electromagnets 110e-h in magnetic structure 145n), the present teachings are not so limited as any number of electromagnets 110 capable of operating according to various aspects of the applicant's teachings may be used as further described herein. Moreover, the magnetic structure of each layer 145a-n need not be identical. For example, though electromagnets 110a-d of the layer 145a may be disposed such that their centerline extends toward the fluid container, in some aspects the electromagnets of the other layer 145n can have a different configuration. By way of example, the electromagnets 110e-h of layer 145n may be oriented substantially orthogonally (or another non-zero angle) relative to the plane containing the centerline of the electromagnets 110a-d, as discussed in detail below.

The magnetic structures 145a-n can be formed from a plurality of electromagnets disposed around the fluid container at one or more different vertical heights, with each electromagnet being individually controlled to generate a desired magnetic field within the fluid container effective to influence the magnetic particles disposed therein. Based on the selective application of electrical signals to the plurality of electromagnets surrounding the fluid container, the magnetic particles can be influenced to rotate, spin, move horizontally side-to-side, and/or vertically up-and-down within the fluid sample by the combined effect of the magnetic field gradients generated by the various electromagnets. By way of example, the signals applied to the electromagnets 110 of each magnetic structure (e.g., in a single horizontal layer) can be configured to generate magnetic field gradients substantially in the x-y plane, while the signals applied to the electromagnets of the different magnetic structures, can result in magnetic field gradients exhibiting a z-direction or vertical component. In this manner, the combined effect of the plurality of electromagnets can produce a magnetic field within a fluid container with different characteristics, such as different strengths and/or directionality so as to rapidly and efficiently mix the fluid and/or capture target analytes within the fluid, by way of non-limiting example.

In various aspects, a single layer of electromagnets (e.g., magnetic structure 145 arranged at a height above the bottom 115b of the fluid chamber about the periphery of the fluid container) can be actuated to generate a magnetic field within the fluid container 115 that captures and/or suspends the magnetic particles 120 in a particular plane within the fluid container. For example, the magnetic particles 120 can be suspended in a particular plane to move the magnetic particles away from the bottom of the fluid container during a fluid collection process and/or for processing fluids (e.g., reagents) in a plane above material (e.g., cells adhering to the lower surface of the fluid chamber), where contact with the material on the lower surface of the fluid chamber is to be avoided.

In some embodiments, the vertical position of one or more of the magnetic structures may be adjustable, for instance, to process different sample volumes and/or to affect a characteristic of a magnetic field generated by the magnetic assembly. By way of example, in some aspects, the magnetic structure 145n of FIG. 1B, can be vertically adjustable according to various aspects of the applicant's teachings depending, for example, on the volume of fluid (in the fluid container 114. For example, in a first configuration the magnetic structure 145n can be located at a first location adjacent the upper end 115a of the fluid container 115, and can be actuated in a second configuration to move closer (downward in FIG. 1B) toward the lower magnetic structure 145a. It will be appreciated, for example, that the position of the magnetic structure 145n with respect to the magnetic particles and/or other magnetic structures (i.e., magnetic structure 145a) may affect the location, strength, intensity, direction, or other characteristics of the magnetic field gradient generated by the electromagnetic assembly 105 within the fluid container 115. In this manner, the magnetic structure 145n can be moved to various heights in order to optimally process fluids of different volumes and/or to alter the characteristics of magnetic field gradients generated in the fluid container 115. Though the above description of FIG. 1B provides for the movement of a single magnetic structure 145n relative to another magnetic structure 145a of assembly 105, it will be appreciated that any number of layers magnetic structures 145 can be moved by a positioning element (not shown) that is configured to adjust the position of one or more electromagnets 110 or one or more of magnetic structures 145a-n relative to one another, and/or to adjust the position of the entire magnetic assembly 105 relative to the sample well fluid container 105. Non-limiting examples of positioning elements may include rotary actuators, linear actuators, servomotors, electronic motors, or the like. In some embodiments, the volume of fluid in the fluid container 105 can be measured by measuring a device (not shown) such that the positioning element can automatically adjust the position of one or more electromagnets 110 and or magnetic structures 145a-n based on the measured volume of fluid in the fluid container 115 and/or the requirements of the fluid processing protocol. In some embodiments, the positioning element can be configured to adjust the position of one or more electromagnets 110 and/or magnetic structures 145a-h based on user input, manual input, a sample processing protocol, and/or a pre-set volume.

Figure 1C:
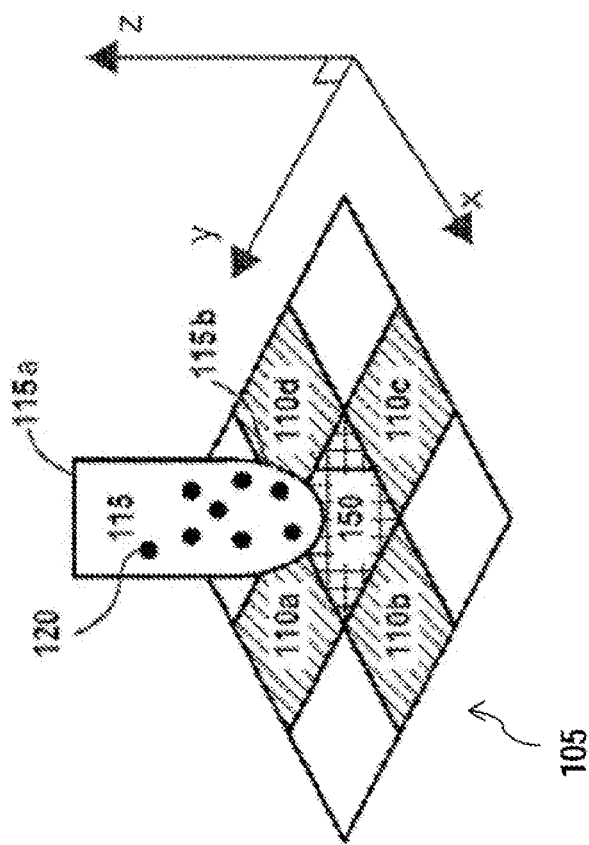
Figure 1D:
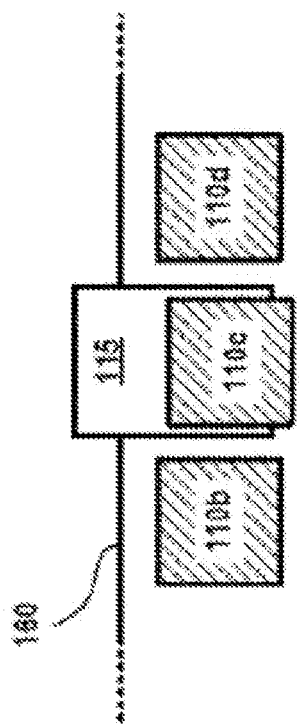

With reference now to FIG. 1C, an exemplary fluid processing system according to various aspects of the applicant's teachings is depicted as a standalone mixing device. For instance, the system of FIG. 1C can include a magnetic assembly 105 that can be used as the mixing element of a magnetic mixer or as a mixing element of a vortex-type mixer (i.e., replacing the motor-driven mixing element). In some embodiments, the fluid container 115 (e.g., a single vial and/or a sample well of a sample plate) can be pressed against an actuator 150 within a cavity formed between the electromagnets 110a-d to initiate the controller 125 to actuate the electromagnets 110a-d. In some alternative embodiments, as shown in FIG. 1D, for example, the magnetic assembly 105 may be configured to mix magnetic particles 120 within the sample wells of open-well sample plate (i.e., open-to-atmosphere, sealed with a removable covering or cap, and/or partially enclosed), such as a conventional 4, 8, 12, or 96 open well sample plate modified in accordance with the present teachings. As shown in FIG. 1D, the fluid container 115 (i.e., sample well) of a sample plate 160 may be disposed between the electromagnets 110a-d.

Figure 2:
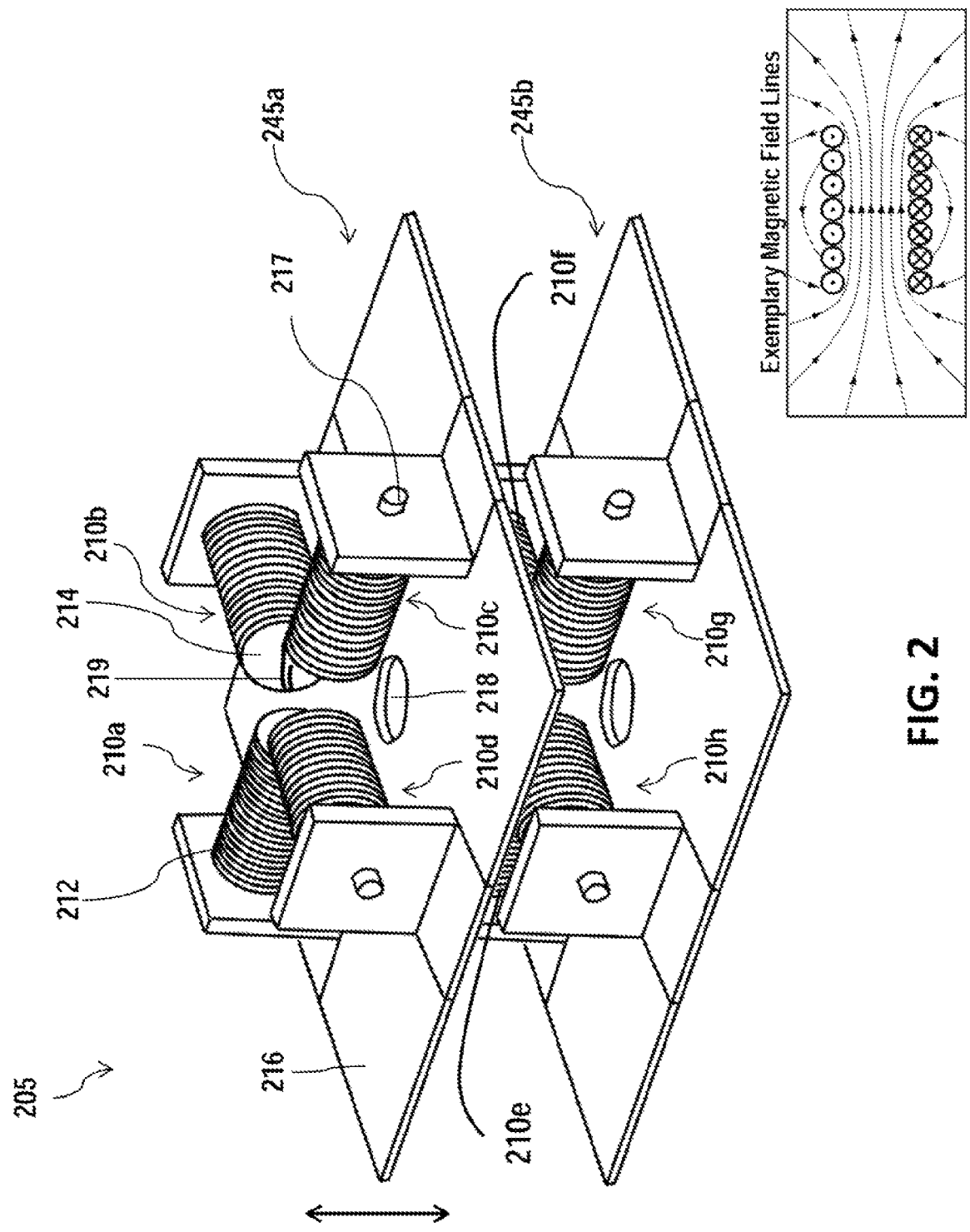
FIG. 2 depict another exemplary magnetic assembly according to various aspects of the applicant's teachings.

With reference now to FIG. 2, another exemplary fluid processing magnetic assembly 205 according to various aspects of the applicant's teachings is depicted. As shown in FIG. 2, the assembly 205 includes an upper magnetic structure 245a and a lower magnetic structure 245b, each of which includes four electromagnets 210 comprising an electrically-conductive wire 212 in the form of a coil. In some aspects, the coil 212 can be wrapped around an inner core 214 (e.g., formed of iron) so as to increase the strength of the magnetic field. In accordance with exemplary aspects of the present teachings, the coil 212 can be mounted via brackets on a plate 216 that includes a bore 218 extending therethrough along a center axis of the structure 245a. The mounting brackets can additionally include posts 217 that enable the coil 212 to be coupled to a power supply (or grounded) to complete an electrical circuit so as to allow an electrical current to flow through the electromagnets 210 in accordance with the present teachings. As shown the inner ends of the electromagnets 210a-d can be spaced apart from the central axis so as to receive a fluid container therebetween, which can also be disposed through the bore 218. In various aspects, an inner surface of the electromagnets 210a-d can additionally include a coupling mechanism 219 that exhibit a shape that is configured to correspond to an external surface of a fluid container (not shown) so as to maintain the alignment during fluid processing within the assembly 205.

As depicted in FIG. 2, each coil 212 can comprise a plurality of turns of the conductive wire about a centerline that extends through the center of the coil toward the center axis. When an electric signal is applied to the wire, a magnetic field is generated thereby such as that generated by a solenoid (e.g., all parts of the current loop contribute magnetic field in the same direction within the coil according to the right-hand rule, substantially parallel to the centerline). In addition, the magnetic field generated by the electrical signal extends generally along the centerline outside of the coil 212 as demonstrated by the exemplary magnetic field lines depicted in the inset. The coil 212 can have a variety of dimensions, but typically exhibits a length (e.g., in a direction along the centerline) substantially greater than its diameter. In this manner, by aligning the centerline of the coil 212 of each of the electromagnets 210a-d (i.e., the centerlines of each coil 212 in the upper magnetic structure 245a are coplanar) toward the center axis of the magnetic assembly upon which the fluid container can be disposed (e.g., and through bore 218), the electromagnets 210a-d can each generate a field within the fluid container. Depending on the direction of the current through the loop (e.g., based on the polarity of the voltage applied thereto), the magnetic fields generated by opposed pairs of electromagnets can substantially align in the same direction such that the magnetic field is further enhanced. By way of example, an identical electrical signal applied to posts 217 of the opposed pair of electromagnets 210a,c can generate additive magnetic fields in parallel to one another. In various aspects, an AC or RF signal can be applied to the various electromagnets 210a-d such that the magnetic field gradients change over time, thereby causing the fluid to experience mixing due to the corresponding movement of the magnetic particles within the fluid chamber at the various time points.

Additionally, as shown in FIG. 2, the assembly 205 includes a lower magnetic structure 245b, which also includes four electromagnets 210e-h similar to those of the structure of the upper magnetic structure 245a. Though the lower magnetic structure 245b can be vertically fixed relative to the upper magnetic structure 245a, in some aspects the distance between these structures can be adjusted as indicated by the arrow in FIG. 2, as discussed otherwise herein. Moreover, though each of the electromagnets 210a-d is substantially vertically aligned with one of the electromagnets 210e-h, it will be appreciated that the electromagnets of each layer can be offset relative to one another such that improved vertical mixing can be generated when appropriate electrical signals are applied thereto. Additionally or alternatively, the electrical signal applied to the lower electromagnets 210e-h can differ from the corresponding electromagnet of the upper magnetic structure 245a such that magnetic field gradients are additionally generated in the vertical direction (e.g., in the direction of the center axis of the magnetic structure 245a,b. In some exemplary aspects, the same electrical signals can be applied to the electromagnets of the upper layer 245a as the lower layer 245b, except that the signal applied to the electromagnets of the lower layer is rotated by 90 degrees. For example, the electrical signal applied to electromagnet 210g can be the same as that applied to electromagnet 210b. Similarly, the electrical signal applied to electromagnet 210h can be the same as that applied to electromagnet 210c, etc.

As noted above, the electrical signal applied to the electromagnets of the assembly 205 can have a variety of forms. In some aspects, for example, the electromagnets 210a-d can be controlled via the application thereto of RF signals having different phase delays, such as the following exemplary phase delay equations:

$$I_A = I_0 \sin(ft) \qquad \text{eq. (1)},$$

$$I_B = I_0 \sin(ft + \pi/2) \qquad \text{eq. (2)},$$

$$I_C = I_0 \sin(ft + \pi) \qquad \text{eq. (3)},$$

$$I_D = I_0 \sin(ft + 3\pi/2) \qquad \text{eq. (4)},$$

wherein I=electrical current, f=frequency, and t=time.

The phase delay of the electromagnets 210a-d of the magnetic structures thus produces a 90° phase shift for adjacent electromagnets. However, embodiments are not so limited, as other phase shift values may be used according to various aspects of the applicant's teachings, such as a 180° phase delay, a 270° phase delay, or the like. In various aspects, the actuation of the electromagnets 210-d according to the phase delay equations above causes the magnetic particles (not shown) in the fluid container to mix in a substantially clockwise or counterclockwise direction depending on the phase shift between the signals applied to individual electromagnets. In various aspects, the mixing can comprises alternately mixing the fluid in a first direction (e.g., clockwise) for a first duration, and then modifying the electrical signal applied to the electromagnets 210a-d to mix the fluid in a second duration (e.g., counterclockwise). By way of example, the fluid mixing pattern by the electromagnets of the lower structure 245b can be controlled to differ in isolation by apply the following exemplary RF signals of different phase delays to the electromagnets 210e-h, respectively:

$$I_E = I_0 \sin(ft - \pi/2) \qquad \text{eq. (5),}$$

$$I_F = I_0 \sin(ft - \pi) \qquad \text{eq. (6),}$$

$$I_G = I_0 \sin(ft - 3\pi/2) \qquad \text{eq. (7),}$$

$$I_H = I_0 \sin(ft) \qquad \text{eq. (8),}$$

wherein I=electrical current, f=frequency, and t=time.

In light of the exemplary signals above in equations (1)-(8), it will be appreciate that the electromagnets in each layer can also exhibit a phase difference relative to its corresponding electromagnet in the other layer. By way of example, electromagnet 210a can have an exemplary signal $I_A$ (eq. 1) applied thereto while the corresponding electromagnet 210e disposed directly below 210a can have an exemplary signal $I_E$ (eq. 5) applied thereto which differs in phase by 90°, all by way of non-limiting example.

It will thus be appreciated in light of the present teachings that different mixing patterns can be effectuated by controlling the RF waveforms applied to the electromagnets of a magnetic structure. Mixing fluids using magnetic particles agitated according to various aspects of the applicant's teachings can thus cause the magnetic particles to be dispersed homogeneously within each fluid container, providing for optimal exposure and enhanced mixing with the fluid. In this manner, the magnetic particles can be influenced to rotate, spin, move horizontally side-to-side, and/or vertically up-and-down within the fluid sample by the combined effect of the magnetic field gradients generated by the various electromagnets 210a-h. Mixing fluids using magnetic particles agitated according to various aspects of the applicant's teachings causes the magnetic particles to be dispersed homogeneously vertically and horizontally within each fluid container, providing for optimal exposure and enhanced mixing with the fluid. In some embodiments, at least a portion of the electromagnets may be operated in parallel, sequence, pulsed, or the like. In various aspects, the current supplied to the electromagnets may be controlled according to a processing protocol. In some embodiments, the processing protocol may be dynamically altered during operation of the fluid processing system based on various factors, such as feedback, operator input, detection of mixing efficiency, analysis results, or the like.

Although the RF waveforms described above exhibit a ±90° shift relative to the adjacent electromagnets, the present teachings are not so limited. Indeed, it will be appreciated that any type of waveform may be supplied to electromagnets capable of operating according to applicant's teachings. By way of non-limiting example, the number of electromagnets surrounding each fluid container, the phase shifts between adjacent electromagnets (e.g., a 30°, 60°, 90°, 120°, 150°, 180°, 210°, 240°, 270°, 300°, and 330° phase shifts), and the waveform shape can be varied in accordance with variance aspects of the present teachings. In some aspects, for example, an electrical signal exhibiting a square waveform can be applied to the electromagnets of significantly lower frequency than the RF signals described above. Over the period of the square waveform, the voltage can be switched between positive and negative voltages so as to adjust the direction of the magnetic field of the electromagnet, and thus change the direction of the force on the magnetic particles. By way of non-limiting example, the square wave can exhibit a frequency in a range of about 0.5 Hz to about 30 Hz. Applicant has discovered, for example, that such low-frequency square waves can be easier to generate relative to similar low-frequency sinusoidal waves, and further that the longer period (i.e., reduced frequency) for a given magnetic field gradient within the fluid chamber can provide additional time to allow relatively weaker paramagnetic particles to be driven in the direction of the gradient. Applicant has determined that magnetic assemblies in accordance with various aspects of the present teachings can obtain substantially the same amount of mixing with reduced power consumption (e.g., a decrease of about 75%) relative to a system in which the wire coils are oriented in a direction substantially along the center axis of the magnetic assembly.

Additionally, as noted above, the electromagnets 210a-h can alternatively have a DC signal applied so as to generate a static magnetic field so as to draw magnetic particles to one side of the fluid container (and out of the bulk fluid) so as aid in fluid transfer from the container after the mixing step and/or prevent the aspiration of the magnetic particles, by way of non-limiting example. In some embodiments, only a single layer of electromagnets 210a-d (i.e., magnetic structure 245a, e.g., arranged at a height above the bottom of the fluid chamber about the periphery of the fluid container) can be actuated to generate a magnetic field within the fluid container that captures and/or suspends the magnetic particles in a particular plane within the fluid container (e.g., at the level of magnetic structure 245a) to move the magnetic particles away from the bottom of the fluid container during a fluid collection process and/or for processing fluids (e.g., reagents) in a plane above material (e.g., cells adhering to the lower surface of the fluid chamber), where contact with the material on the lower surface of the fluid chamber is to be avoided.

In another example, the fluid processing systems described herein can be utilized in fluid containers that do not contain static amounts of liquid. Now with reference to FIG. 3, the fluid processing systems herein described can be utilized to implement mixing of magnetic particles in an open port probe device, such as those described in United States Published Application No. 2017/0316926, hereby incorporated by reference and also described in Abstract and/or Poster "Coupling Solid-Phase Micro-Extraction (SPME) to Mass Spectrometry via an Open-Port Probe (OPP) Sampling Interface", Chang et al. at $21^{st}$ International Mass Spectrometry Conference, Toronto, incorporated by reference in its entirety. Another exemplary open port probe that can be modified in accordance with the present teachings is disclosed in an article entitled "An open port sampling interface for liquid introduction atmospheric pressure ionization mass spectrometry" authored by Gary Van Berkel and Vilmos Kertesz, and published in Rapid Commun. Mass Spectrom. 29, 1749-1756 (2015).

Figure 3:
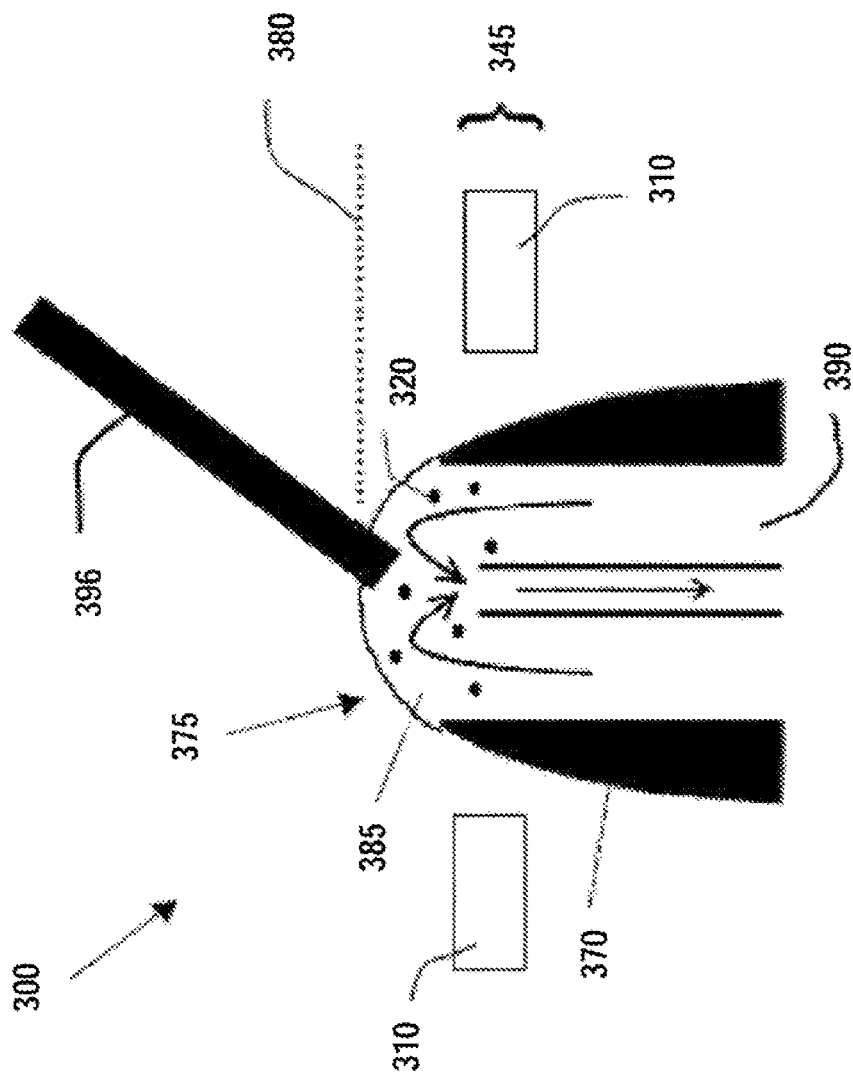
FIG. 3 depicts another exemplary fluid processing system utilizing a magnetic assembly with an exemplary open port probe.

As shown in FIG. 3, the open port probe 300 comprises a tube 370 having an open ended tip 375 that is configured to both introduce and extract solvent 385 on a continuous basis providing a steady state level 380 of solvent at the tip end 375. In this particular example, the open port probe 300 comprises a first cylindrical member disposed within a second cylindrical member arranged in a co-axial arrangement. The solvent 385 travels towards the tip end 375 through the annular space 390 between the two cylindrical members and then travels away from the tip end 375 through the inner cylinder as depicted in the arrows in the figure defining the fluid path. As should be appreciated, if no inflow or outflow of fluid is present, the solvent 385 level will remain steady and in many respects, the open port probe 300 will operate in a similar manner to the other fluid containers described previously, such as a vial. The open port probe 300 can be used to extract analytes from a substrate surface that comes into contact with the solvent 385 at the tip 375. In several embodiments, small magnetic particles 320 can be introduced into the solvent at the tip 375 of the open port probe 300 and in combination with the fluid processing systems and magnetic assemblies and/or structures 345, comprising electromagnets 310 herein described, the magnetic particles can be influenced to resist the outflow of solvent 385 from the tip end 375 and remain in the vicinity of the tip end by virtue of the presence of the magnetic fields. In addition, the magnetic assemblies and/or structures cause the magnetic particles to spin, or travel back and forth in x-, y-, and z-directions as confined by the presence of the magnetic fields. While the electromagnetics can typically be chosen to be sufficiently strong to prevent any escape of magnetic particles from the tip surface, a downstream permanent magnetic (not shown) can also be used to capture magnetic particles, thereby preventing any downstream analysis from contamination. The presence of the magnetic particles 320 at the open port probe tip 375 can assist in the mass transfer of analytes (or portions thereof) from a substrate surface into the solvent. In an embodiment, the substrate surface that comes into contact with the solvent may comprise a Solid Phase Microextraction (SPME) fibre 396. The SPME fibre 396 can contain an embedded analyte which is extracted (or desorbed) into the solvent 385 upon contact. The substrate surface may be any material configured to hold an analyte sample, and can include various examples such as a mesh material or blade like surface. In some aspects, the substrate surface can be the surface of the magnetic particle itself, for example, following capture of the analyte on a surface of a functionalized magnetic particle for subsequent elution of the analyte within the open port probe.

While cylindrical members have been described above in describing the tube 370, it should be appreciated that other shapes with varying cross-sectional shapes may also be utilized include triangular, square, rectangular or any other multi-sided shape. The magnetic assemblies and/or magnetic structures that comprise electromagnets may be placed outside of the metal tube or may be part of the metal tube itself and directly integral to metal at or near the tip.

The presence and mixing of the magnetic particles 320 may also assist in the disruption of bubbles that may generate at the open port probe tip 375. These may be caused for example by the usage of compressed gas driven pumps that are utilized to deliver solvent into the open port probe. The outflow of solvent containing an analyte to be analyzed can then be processed downstream using one or more suitable analytical instruments (e.g., mass spectrometer, detector, etc.)

While this particular embodiment describes the mass transfer of an analyte from a substrate surface to the solvent, it should be appreciated that the present teachings may also be used to assist in the mass transfer in the reverse direction, that is transfer of an analyte (or a portion thereof) from a fluid sample to a substrate surface that has an affinity for the analyte. For example, such as the case for when a biological fluid sample may contain an analyte of interest that is to be transferred to a solid substrate surface that is to be further processed or directly analyzed. The biological fluid sample may be blood, saliva, urine, sweat, plasma, etc.

Figure 4:
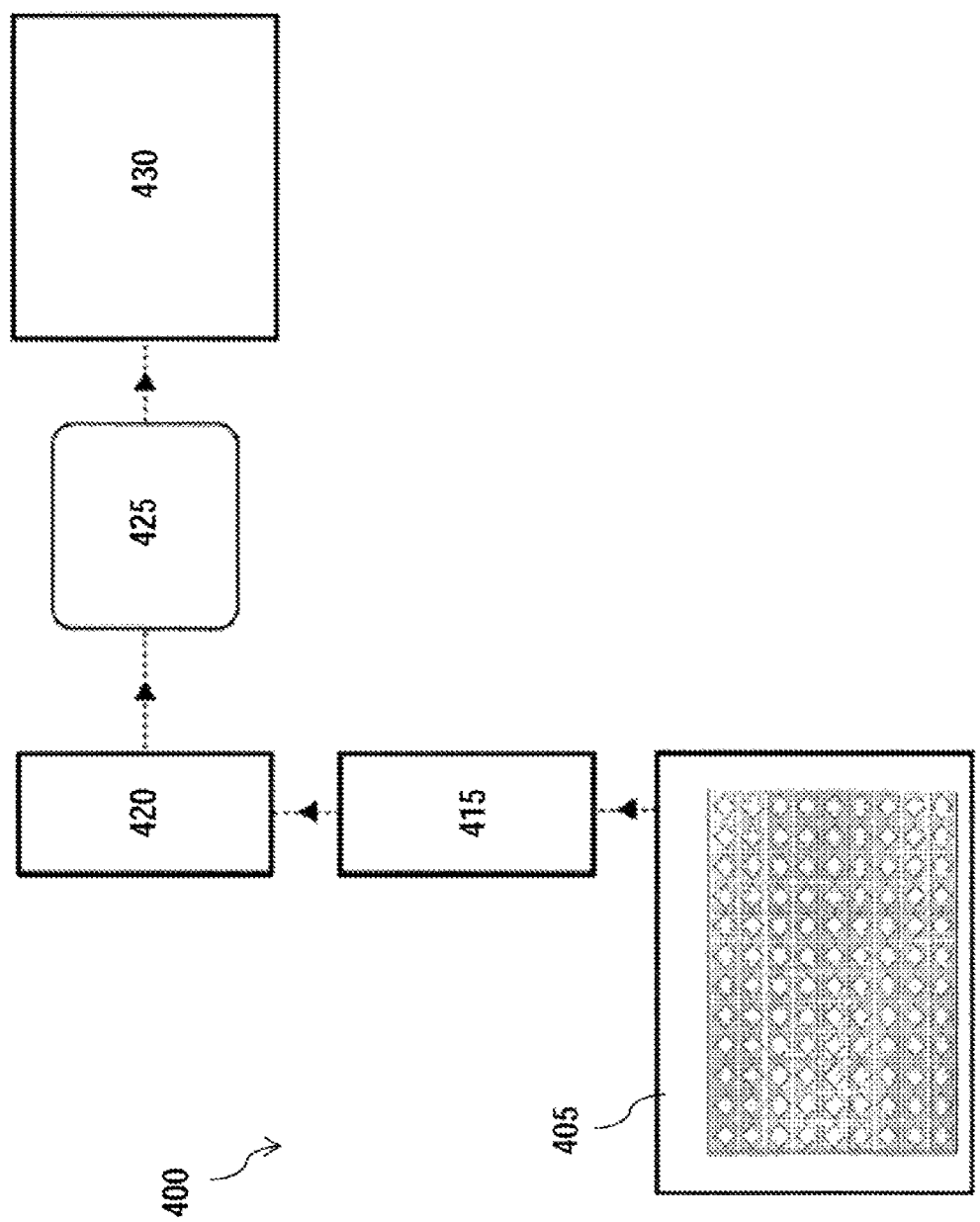
FIG. 4 depicts an exemplary fluid processing and analysis system according to various aspects of the applicant's teachings.

The magnetic structures and fluid processing systems described in accordance with the applicant's present teachings can be used in combination with various analysis equipment known in the art and hereafter developed and modified in accordance with the present teachings, such as an LC, CE, or MS device. With reference now to FIG. 4, one illustrative fluid processing and analysis system 400 according to various aspects of the applicant's teachings is schematically depicted. As shown in FIG. 4, a fluid processing assembly 405 can be configured to process fluid samples using magnetic structures and an open-well sample plate in accordance with various aspects of the present teachings. The processed fluid can be collected from the fluid processing system 405 using any of a manual sample loading device (e.g., pipette, a multi-channel pipette) or various automated systems such as a liquid handling robot, an auto-sampler, or an acoustic liquid handling device (e.g., Echo® 525 liquid handler manufactured by LabCyte, Inc. of Sunnyvale, California), all by way of non-limiting example. The processed fluid may be transferred using various fluid transfer devices, such as a vortex-driven sample transfer device. As noted above, the sample removed from one sample well can be added to a different sample well on the plate for further processing steps or can be delivered to the downstream analyzer. For example, in some aspects, the processed sample can be delivered to an LC column 415 for in-line LC separation, with the eluate being delivered to the ion source 420 for ionization of the processed analytes, which can be subsequently analyzed by a DMS 425 that analyzes the ions based on their mobility through a carrier gas and/or a mass spectrometer 430 that analyzes the ions based on their m/z ratio. In some aspects, processed samples can be transferred directly to an ion source 415, with separation being provided by a differential mobility spectrometer (DMS) assembly, for example, in-line with a MS as described in U.S. Pat. No. 8,217,344. Fluid processing systems described in accordance with the applicant's present teachings in combination with a DMS assembly for chemical separation may eliminate the need for a LC (or HPLC) column for processing samples for MS analysis. In various aspects, processed samples may be introduced into analytical equipment, such as an MS, using a surface acoustic wave nebulization (SAWN) apparatus, an electrospray ionization (ESI) device, and a matrix assisted inlet ionization (MAII) source.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

The invention claimed is:
1. A fluid processing system, comprising:
a magnetic assembly comprising at least one magnetic structure, each magnetic structure comprising a plurality of electromagnets disposed about a center axis, wherein each of the plurality of electromagnets has an electrically-conductive coil disposed about a centerline extending toward the center axis of the magnetic structure, wherein the magnetic structure is configured to receive a fluid container defining a fluid chamber therein for containing a fluid and a plurality of magnetic particles, and wherein each of the plurality of electromagnets are configured to generate a magnetic field within the fluid container disposed on the center axis of the magnetic structure when an electrical signal is applied to each of the electromagnet's electrically-conductive coil; and a control component coupled to the at least one magnetic structure, the control component being configured to control the magnetic field generated by each of the plurality of electromagnets to generate a magnetic field gradient within the at least one fluid container sufficient to magnetically influence the plurality of magnetic particles within the fluid, wherein the control component is configured to control the magnetic field generated by each of the plurality of electromagnets via applying a square waveform to each of the plurality of electromagnets.

2. The system of claim 1, wherein the centerline of each of the plurality of electromagnets is co-planar with the centerline of the other of the plurality of electromagnets.

3. The system of claim 1, the fluid chamber extending from a lower, closed end to an upper, open end configured to be open to the atmosphere to receive the fluid to be processed therethrough.

4. The system of claim 1, wherein the magnetic structure comprises four electromagnets.

5. The system of claim 1, wherein the magnetic assembly comprises a plurality of magnetic structures disposed in at least two horizontal layers corresponding to a plurality of vertical positions about the center axis, and wherein each magnetic structure is configured to magnetically influence the plurality of magnetic particles in an x-y direction within its corresponding horizontal layer when an electrical signal is provided to the electromagnets of each magnetic structure independent of the other of said plurality of magnetic structures.

6. The system of claim 5, wherein the plurality of electromagnets comprises:

a first pair of electromagnets each of which has an electrically-conductive coil disposed about a first centerline extending through the center axis, wherein the electromagnets of the first pair are disposed on opposed sides of the center axis; and a second pair of electromagnets each of which has an electrically-conductive coil disposed about a second centerline extending through the center axis, wherein the electromagnets of the second pair are disposed on opposed sides of the center axis, and wherein the second centerline is perpendicular to the first centerline.

7. The system of claim 6, wherein the control component is configured to apply an electrical signal to the electromagnets such that each electromagnet in the first pair generates a magnetic field on the first centerline in the same direction as the other electromagnet in the first pair and such that each electromagnet in the second pair generates a magnetic field on the second centerline in the same direction as the other electromagnet in the second pair.

8. The system of claim 5, wherein the centerline of each of the plurality of electromagnets in each horizontal layer are co-planar, and wherein the centerlines of the electromagnets in each horizontal layer are in a parallel plane relative to the centerlines of the electromagnets in the other of the at least two horizontal layers.

9. The system of claim 1, wherein the magnetic assembly is configured to magnetically influence the plurality of magnetic particles in a z-direction and/or in an x-y direction.

10. The system of claim 1, wherein the magnetic particles are paramagnetic particles.

11. The system of claim 1, wherein the square wave exhibits a frequency in a range of about 0.5 Hz to about 30 Hz.

12. The system of claim 1, wherein the control component is configured to control the magnetic field generated by each of the plurality of electromagnets via applying at least one radio frequency waveform to each of the plurality of electromagnets, wherein the at least one radio frequency waveform applied to each of the plurality of electromagnets in a magnetic structure exhibits a phase delay relative to the radio frequency waveform applied the other of the plurality of electromagnets.

13. A method for processing fluids, comprising:

delivering a fluid and a plurality of magnetic particles to a fluid chamber of at least one fluid container disposed on a center axis of a magnetic assembly comprising at least one magnetic structure, wherein the at least one magnetic structure comprises a plurality of electromagnets disposed about the periphery of the fluid container, each of the plurality of electromagnets having an electrically-conductive coil disposed about a centerline that extends toward the center axis;

providing an electrical signal to each of the plurality of electromagnets so as to generate a magnetic field within the at least one fluid container, wherein the magnetic field is configured to influence the plurality of magnetic particles and wherein the magnetic field is generated by each of the plurality of electromagnets via applying a square waveform to each of the plurality of electromagnets;

adjusting the electrical signal to modify the magnetic field within the fluid sample;

and thereafter withdrawing the sample fluid from the fluid container.

14. The method of claim 13, wherein the magnetic particles are paramagnetic particles, wherein adjusting the electrical signal comprises applying a square waveform to each of the plurality of electromagnets.

15. The method of claim 13, wherein the fluid chamber extends from a lower, closed end to an upper, open end configured to be open to the atmosphere to receive the fluid to be processed therethrough.

16. The method of claim 13, wherein the fluid container comprises an open port probe, the open port probe comprising a tubular member, an inlet and an outlet for a solvent, a tip end open to the atmosphere and configured such that a solvent is directed to the tip end.

17. The method of claim 13, further contacting a substrate surface having an embedded analyte to the solvent to cause transfer of at least a portion of the analyte from the substrate surface to the solvent.

18. The method of claim 13, wherein the plurality of electromagnets comprises:

a first pair of electromagnets disposed on opposed sides of the center axis, wherein each electromagnet of the first pair has an electrically-conductive coil disposed about a first centerline extending through the center axis, a second pair of electromagnets disposed on opposed sides of the center axis, wherein each electromagnet of the second pair has an electrically-conductive coil disposed about a second centerline extending through the center axis, and wherein the second centerline is perpendicular to the first centerline, wherein the electrical signal provided to each electromagnet in the first pair generates a magnetic field on the first centerline in the same direction as the other electromagnet in the first pair and the electrical signal provided to each electromagnet in the second pair generates a magnetic field on the second centerline in the same direction as the other electromagnet in the second pair.

\* \* \* \* \*